(12) United States Patent
Hacker (10) Patent No.: US 12,544,052 B2
(45) Date of Patent: Feb. 10, 2026

(54) MULTI-FUNCTIONAL SURGICAL INSTRUMENT WITH ATTACHABLE SURGICAL INSTRUMENT BITS

(71) Applicant: Nano Surgical, LLC, Delray Beach, FL (US)

(72) Inventor: Steven M. Hacker, Delray Beach, FL (US)

(73) Assignee: Nano Surgical Inc., Delray Beach, FL (US)

( * ) Notice: Subject to any disclaimer, the term of this patent is extended or adjusted under 35 U.S.C. 154(b) by 218 days.

(21) Appl. No.: 18/227,378

(22) Filed: Jul. 28, 2023

(65) Prior Publication Data

US 2025/0032102 A1    Jan. 30, 2025

(51) Int. Cl.
*A61B 17/00* (2006.01)
*A61B 17/28* (2006.01)
*A61B 17/29* (2006.01)

(52) U.S. Cl.
CPC ........ *A61B 17/00234* (2013.01); *A61B 17/28* (2013.01); *A61B 2017/00353* (2013.01); *A61B 2017/2931* (2013.01)

(58) Field of Classification Search
CPC .... A61B 17/00234; A61B 2017/00353; A61B 2017/2931; A61B 10/0233; A61B 17/3213; A61B 2017/00464; A61B 17/320708; A61B 17/3211
USPC .......................................... 81/489, 487, 491
See application file for complete search history.

(56) References Cited

U.S. PATENT DOCUMENTS

| | | | | |
|---|---|---|---|---|
| 5,322,503 | A * | 6/1994 | Desai | A61B 17/00234 |
| | | | | 606/49 |
| 5,785,443 | A * | 7/1998 | Rubin | B43K 7/005 |
| | | | | 81/439 |
| 7,647,704 | B2 * | 1/2010 | Petersen | A61B 17/3217 |
| | | | | 30/340 |
| 12,303,158 | B2 * | 5/2025 | Snow | A61B 17/068 |
| 2016/0058494 | A1 * | 3/2016 | Vayser | A61B 18/14 |
| | | | | 606/41 |

* cited by examiner

*Primary Examiner* — Julian W Woo
(74) *Attorney, Agent, or Firm* — Quantum Patent Law Firm; Seongyoune Kang (57) ABSTRACT

Surgical instrument bits mate to a multi-function surgical handle. The surgical instrument bits include an integrated light source, and are disposable or reusable. Surgical instrument bits comprise scalpel blades, skin hooks, retractors, curettes, comedone extractors, forceps, elevators, dissectors, elevators, bone hooks, suture removers, punch biopsy instruments and probes, reflecting devices such as mirrors, trocars and splinter liberators.

18 Claims, 8 Drawing Sheets

PRIOR ART

PRIOR ART

MULTI-FUNCTIONAL SURGICAL INSTRUMENT WITH ATTACHABLE SURGICAL INSTRUMENT BITS

FIELD OF THE INVENTION

The invention relates to multi-functional mechanical surgical instruments. More specifically, the invention relates to a plurality of surgical instrument bits that can separately be attached to a single handle to provide multiple surgical functions. The surgical instrument bits comprise a keyed slot for attachment to an elevated boss predisposed in a universal bayonet holder of a handle. The surgical instrument bits may comprise various materials and shapes; they may be light transmissible; and they may be reusable and disposable. Surgical instrument bits may comprise skin hooks, retractors, curettes, comedone extractors, forceps, dissectors, elevators, bone hooks, suture removers, punch biopsy instruments, reflecting devices such as mirrors, trocars and splinter liberators and probes.

BACKGROUND OF THE INVENTION

Physicians and surgeons use a wide variety of surgical instruments for various purposes such as cutting human tissue, retracting, elevating, depressing, punching, probing, inserting, twisting, and foreign body removal. Various surgical instruments have different physical requirements depending on the function of each surgical instrument to carry out procedures efficiently without causing unnecessary tissue injury. Tool-tissue forces vary widely depending on the use of the surgical instrument and the amount of force applied during use of the surgical instrument. For example, the mean average force applied in the field of ophthalmology range from 0.01N for retraction without grasping to 0.06N for sharp penetration. *Tool-tissue forces in surgery; A systematic review*, Ann Med Surg (Lond). 2021 May; 65:102268 (available online Jul. 13, 2023 at <https://www.ncbi.nlm.nih.gov/pmc/articles/PMC8058906/>).
Mean average forces in the field of general surgery range from 4.7N for retraction with grasping; 2.8N for sharp penetration; and 1.7N for cutting. Id. Nervous tissue requires the least amount of force to manipulate with a mean average force of 0.4N, while mean average forces for drilling are 14.1N. Id. The experience of the surgeon is also a factor, as students are found to exert 22.7-29% more force compared to surgical trainees and consultant surgeons. Id. Shape, rigidity, balance, uniformity, and dependability are thus factors in the design of surgical instruments. Surgeons and other users of surgical instruments are knowledgeable about the type of instrument to select for a specific function, and also the characteristics of the instrument, for example the rigidity vs. flexibility of the instrument. Given the ability today to manufacture custom instruments, for example by 3D printing capabilities, the ability to design and acquire a surgical instrument having precise strength and rigidity characteristics is unlimited.

Scalpel blades attached to a scalpel handle are used in a cutting and sawing direction for cutting human tissue or through a precise jerking movement to cut and release sutures. Different sizes of scalpel blades and scalpel handles are required for various uses. In 1915 a 2-piece design of a surgical scalpel blade and scalpel handle was patented. See U.S. Pat. No. 1,139,796 to Parker titled Detachable Blade Knife. Since that time, scalpel handles are known to comprise an elevated boss (also called a universal blade fitting) at one end of a bayonet holder to which a scalpel blade can be removably attached. Typically the scalpel blade is provided with a keyed slot for attachment to the universal blade fitting. In attaching the scalpel blade to the universal blade fitting, the keyed slot portion of the scalpel blade must be slightly deformed, or flexed, to force it into a groove on the universal blade fitting and provide a snap fit. The scalpel blade can be removed from the universal blade fitting by handling one end of the scalpel blade with surgeon's needle holders, elevating the universal blade fitting and pushing the scalpel blade in a forward direction as it slides off the universal blade fitting. However, the cutting end of the scalpel blade must maintain a certain amount of rigidity under pressure to perform its cutting and sawing functions.

Many shapes and materials are known to be used for scalpel handles, ranging from round to flat in shape and plastic, stainless-steel and aluminum in material and some with an illumination source. Depending on the use of the scalpel blade, the geometry, sharpness, material of construction and strength of the scalpel blade can vary. While the amount of force needed to perform penetration of human tissue of course depends on the human tissue involved, scalpel blades are typically substantially rigid and non-deformable on the blade end. Thus, a typical scalpel blade to be used in a 2-piece design with a separate handle will have a sharp blade distal from the handle that is substantially rigid, and a section more proximal the handle comprising the deformable keyed slot as seen in FIG. 3A of U.S. Pat. No. 10,610,257.

ISO 7740 titled Instruments for Surgery—Scalpels with Detachable Blades—Fitting Dimensions sets out standards for good fitting and interchangeability of detachable blades for scalpel blades for various size handles. For example, as seen in FIG. 3, a detachable scalpel blade for use on a No. 3 scalpel handle has a distal end from the surgical site disposed at an angle α of 30° from vertical, which mates with a corresponding angled end surface on the scalpel handle. The keyed slot in the scalpel blade for attachment of the scalpel blade to the scalpel handle comprises a wider body that tapers in width toward the end distal from the handle. The standard dimensions for the keyed slot for a scalpel blade are 1.18-1.23 mm at the narrower end most proximal the surgical site (and distal from the handle) to 2.43-2.48 mm in the wider portion of the keyed slot distal from the surgical site (and proximal the handle). The length of the keyed slot is 17.83-17.90 mm, and the distance between the end of the keyed slot distal from the surgical site to the angled edge of the scalpel blade that attaches to the scalpel handle is 4.50-4.65 mm. For a No. 4 scalpel handle the keyed slot in the scalpel blade for attachment of the scalpel blade to the scalpel handle has standard dimensions of 1.95-2.00 mm at the narrower end most proximal the surgical site and 3.72-3.77 mm in the wider portion of the keyed slot distal from the surgical site. The length of the keyed slot is 24.20-24.27 mm, and the distance between the end of the keyed slot distal from the surgical site to the angled edge of the scalpel blade that attaches to the scalpel handle is 7.50-7.65 mm.

Besides scalpel blades attached to scalpel handles, different surgical instruments are required for various other surgical functions, such as skin hooks, retractors, curettes, comedone extractors, forceps, elevators, dissectors, elevators, bone hooks, suture removers, punch biopsy instruments, reflecting devices such as mirrors, trocars and splinter liberators and probes. Surgical instruments such as skin hooks, retractors, elevators, trocars and dissectors have a straight elongated handle and are used in a pulling or pushing direction. Other surgical instruments such as curettes, comedone extractors, punch biopsy instruments, and splinter liberators and probes have a straight handle and are used to rotate, twist, scrape, depress or insert when holding the handle. In addition to having varying shapes and materials, these surgical instruments vary over a wide range of sizes. Some surgical devices for example, a particular type of retractor, exist in various sizes for rotating, scraping, depression, elevation, pushing, inserting, pulling and twisting of the single handle. A skin hook comes with small size forks or large size forks, while a punch biopsy and curettes come in multiple millimeter sizes and gradations. Each surgical instrument may have different requirements for rigidity and/or flexibility depending on its use, as previously noted.

Some surgical instruments are long and some are short, some are thinner and some are wider. In addition, different sizes of the same surgical instrument may be required to accommodate different sizes of a handle. Because of this wide variation in shapes and sizes, a wide variety of instruments must be owned by a surgeon or other type of doctor, to perform even a minor surgical procedure such as splinter, suture or foreign body removal, or major surgical procedure such as more retracting of the skin or body cavities away from the cutting area of the surgical site or to open a body cavity for better access.

Additionally, a surgeon may not have an integrated illuminating device for each of these surgical instruments as it is currently not described prior to this art and, even if it were available, it is not practical to buy a separate lighted handle for each of the many different scalpel handles, skin hooks, retractors, curettes, comedone extractors, forceps, elevators, dissectors, elevators, bone hooks, suture removers, punch biopsy instruments, reflecting devices such as mirrors, trocars and splinter liberators and probes that doctors may individually prefer. Nor would it be preferable given the amount of space required for this type of tool on a surgical tray.

European Patent Application No. EP0997108A2 discloses a multi-function surgical instrument that includes a catheter, a bipolar hemostat assembly, an attachment member, and a surgical tool. The attachment member is disposed within the catheter and has a proximal end and a distal end where the distal end is movable within the aperture of the bipolar electrode assembly between a first position wherein the distal end is extended from the bipolar electrode assembly and a second position wherein the distal end is retracted within the bipolar electrode assembly. The surgical tool is attached to the distal end of the attachment member.

U.S. Pat. No. 11,045,250 discloses surgical instruments and, more particularly, multi-function surgical instruments capable of operating in both a bipolar mode and a monopolar mode.

Wallweiner et al. (1995) "Multifunctional Instrument for Operative Laparoscopy", Endoscopic Surgery & Allied Technologies, 3(2-3):119-124) discloses a multifunctional instrument consisting of a 10 mm diameter "rod" attached to handle having a small keyboard. As depicted in FIG. 3, the rod (300) contains a needle electrode (301) for electrothermal cutting that can be advanced or retracted pneumatically, a 2.7 mm diameter channel (302) for suction or irrigation, and an open 5 mm diameter channel (303) into which various 5 mm diameter, conventional single purpose laparoscopic instruments can be inserted.

US20100063437A1 discloses instruments that can perform several surgical functions without the need for removing the surgical instrument from the body of the patient. Specifically laparoscopic surgical instruments are introduced through small, surgically created openings (ports) in a patient. A tubular device known as trocar (101) is placed in each opening.

Farin (1993) "Pneumatically Controlled Bipolar Cutting Instruments", Endosocopic Surgery & Allied Technologies, 1(2):97-101) discloses an instrument having separate suction and irrigation channels within a large diameter "shaft." Inside the irrigation channel is a needle electrode capable of being advanced or retracted pneumatically.

Bakshi et al. (2003) "A Multifunctional, Modified Rigid Neuroendoscopic System: Clinical Experience with 83 Procedures," J. Neurosurgery, 99:421-425) discloses a multifunctional instrument designed specifically for neurosurgery.

U.S. Patent Application Publication No. US 2004/0249366 A1 to Kunz discloses a multifunctional instrument for use in microinvasive surgery that includes an operator hand grip, a multi-lumen tube fastened on the operator hand grip, at least two guide channels coaxially configured inside the tube, surgical instruments that are displaceably and rotationally disposed in the guide channels, and a shaft at whose distal end one surgical working element each is disposed. The instruments can be displaced between a rest position, in which the respective working element is retracted into the tube, and a working position, in which the respective working element projects from the distal end of the tube. The instruments can be displaced into and out of the working position by means of a motor and at least one of the instruments can be rotated in its working position by means of a motor. The instrument can be controlled by means of an electronic control that controls at least the motor-driven displacement motions and rotational motions of the surgical instruments and the tube.

U.S. Pat. No. 5,904,080 and U.S. Patent Application Publication No. 2006/0130621 A1 describe a multi-tool screwdriver described can include at least six, if not more, tools in one screwdriver.

Chinese Patent No. CN213430421U discloses orthopedics medical instruments, particularly, a multi-tool-bit switchable medical scalpel. In order to solve the problem that in the prior art, different cutters need to be repeatedly pulled out or inserted into the body of a patient when the cutters are switched, and the risk of soft tissue injury of the patient is increased. The utility model provides a multi-cutter-head switchable medical scalpel which comprises a containing pipe sleeve, and an adjusting sleeve is rotationally connected with the containing pipe sleeve. At least two cutter containing cavities are formed in the containing sleeve, the cutter assemblies are connected with the cutter containing cavities in a sliding mode, an adjusting assembly is arranged in the adjusting sleeve, and when the adjusting sleeve is rotated to enable the adjusting assembly to be located above the cutter assemblies, the adjusting assembly pushes the cutter assemblies to slide relative to the cutter containing cavities. Due to the fact that the multiple cutter assemblies are arranged, in the operation process, switching of different cutter assemblies can be achieved only by rotating the adjusting sleeve, the whole cutter does not need to be pulled out, and the risk of soft tissue injury of a patient is reduced.

U.S. Pat. No. 11,166,746B2 discloses an integrated device for hair follicle extraction and implanting, comprising a body mechanism and a connecting mechanism, the body mechanism comprising a body supporting frame, a first motor, a transmission frame, a second motor, a clamping component, a transmission mechanism and a pushing needle, the connecting mechanism comprises a connecting head, a fixing head and a cutter head, wherein the first motor of the body mechanism controls the up and down movement of the cutter head through the cooperation of the transmission frame and the transmission mechanism, and the second motor controls the pushing needle by the rotary motion of the clamping unit, simultaneously controls the rotational movement of the cutter head through the transmission mechanism.

SUMMARY OF THE INVENTION

In one embodiment of the invention, a plurality of surgical instrument bits is provided that mate with a handle allowing for the handle to be used for a wide range of surgical functionalities. The handle may comprise integrated illumination.

In one embodiment, the surgical instrument bits comprise a keyed slot for reversible attachment to a substantially rigid elevated boss disposed on a universal bayonet holder attached at one end of the handle. The keyed slot is configured to fit securely into a groove disposed in the elevated boss, thus reversibly and securely attaching the surgical instrument bit to the universal bayonet holder and handle. The keyed slot is deformable and flexible so that when torque is applied to the handle, a force is applied to the keyed slot allowing it to deform and be inserted over the elevated boss and thereafter be guided along a groove in the elevated boss until it "clicks" and attaches reversibly and securely to the elevated boss of the universal bayonet holder.

In one embodiment, the surgical instrument bits comprise a substantially rigid end distal from the handle and a deformable and flexible keyed slot.

In one embodiment, the surgical instrument bits comprise a deformable and flexible neck and a deformable and flexible keyed slot, wherein the neck is located between the distal end of the surgical instrument bit and the keyed slot. The deformable and flexible neck provides the ability of the functional end of the surgical instrument bits to flex upon the administration of force. Flexibility in the functional end of the surgical instrument bit adds a range of function, force and direction which can be advantageous to the user, for example due to the many unusual angles several of the surgical instrument bits are used. A surgeon having knowledge in the field can determine the specific characteristics for any surgical instrument bit based on the desired function. For example, a surgical instrument bit intended to be used for cutting and sawing may require more rigidity and less flexibility than a surgical instrument bit intended to be used for dissection.

In one embodiment, each of the surgical instrument bits when attached to a handle constitutes a standalone surgical instrument to carry out the intended surgical function of each such surgical instrument bit.

In one embodiment, the surgical instrument bits comprise a cylindrical or horseshoe shaped housing in the form of a socket and the universal bayonet holder is configured as a plug to engage an aperture in one end of the socket.

In one embodiment, the surgical instrument bits attach to the handle using a pin and clevis attachment comprising a pin inserted through a hole or eye and secured with a clevis pin or cotter pin allowing for rotational movement.

In one embodiment, the surgical instrument bits attach to the handle using a bolt and nut threaded fastener system where a bolt is inserted through holes in the handle components and secured with a nut to provide for a strong and secure attachment.

In one embodiment, the surgical instrument bits attach to the handle using a magnetic attachment to join components together.

In one embodiment, a plurality of surgical instrument bits is provided to mate with different handles, including but not limited to Numbers 3 through 9, at a minimum.

In one embodiment, the plurality of surgical instrument bits may be used with a handle having an integrated Light Emitting Diode (LED) as disclosed in U.S. Pat. Nos. 9,072,541 and 10,610,257.

BRIEF DESCRIPTION OF THE DRAWINGS

The foregoing features of the invention will become more readily understood by reference to the following detailed description when taken in conjunction with the accompanying drawings, wherein.

DETAILED DESCRIPTION OF THE INVENTION

In one embodiment of the invention, a plurality of surgical instrument bits is provided that mate with a handle allowing for one handle to be used as a stand-alone surgical instrument for a wide range of functionalities. The handle may comprise integrated illumination. In one embodiment, the plurality of surgical instrument bits includes scalpel blades, skin hooks, retractors, curettes, comedone extractors, forceps, elevators, dissectors, elevators, bone hooks, suture removers, punch biopsy instruments, reflecting devices such as mirrors, trocars and splinter liberators and probes.

In one embodiment, the surgical instrument bits comprise a keyed slot for reversible attachment to an elevated boss disposed on a universal bayonet holder at one end of the handle. The keyed slot is configured to fit securely over the elevated boss, thus reversibly and securely attaching the surgical instrument bit to the universal bayonet holder and handle. The elevated boss is rigid. When the keyed slot of the surgical instrument bit is placed over the elevated boss and torque is applied to the handle, a force is applied to the keyed slot causing it to flex and deform, allowing it to be guided along a groove in the elevated boss until it attaches reversibly and securely to the elevated boss of the universal bayonet holder.

In attaching the surgical instrument bit to the elevated boss, attention is required to manipulate the keyed slot around the elevated boss and thereafter to flex the surgical instrument bit to force it onto the universal bayonet holder in a manner to provide a snap fit. When mounted reversibly on the handle, the surgical instrument bit is removed in a similar manner, except in reverse, whereby a needle holder or similar type of device grabs the rear of the surgical instrument bit and slightly elevates and flexes off the rear end of the surgical instrument bit off the rear or proximal end of the universal bayonet holder. Force is applied in the direction of the surgical site to enable the surgical instrument bit to flex upwards and slide off the universal bayonet fitting, and either be sterilized for reuse or disposed of according to guidelines for disposable single use instruments.

The keyed slot may be formed of a stainless steel, aluminum, resilient or a plastic material or a finely divided solid which behaves like a plastic material. Hence, the deformable nature of the keyed slot can be formed from various types of materials. In addition, it can take on various shapes, as desired. Its only requirement is that it have a surface which can be flexed and deformed under the influence of an applied force, such deformation not being permanent.

It will be appreciated from the foregoing description that the invention provides a handle that is suitable for use with multiple surgical instrument bits of various sizes and shapes. The same handle can be used to hold each surgical instrument bit in a manner to apply pressure in a direction, when connected, that is typically applied to consummate the function provided for by the specific surgical instrument. For example, the user may desire the functionality of rotation for a punch excision; elevation for a retractor; hook or elevator; depression for an extractor; scraping for a curette; and probing for foreign body liberator. The handle of the invention can also retain the function of a scalpel handle.

A wide variety of surgical instrument bits may be used in accordance with the invention. The flexibility of the end of the surgical instrument bit allows it to fit over a wide variety of handles of various shapes, flat and round, with and without illuminating device, with an elevated boss.

In one embodiment, the surgical instrument bits comprise a deformable and flexible neck and a deformable and flexible keyed slot, wherein the neck is located between the distal end of the surgical instrument bit and the keyed slot. The deformable and flexible neck provides the ability of the functional end of the surgical instrument bits to flex upon the administration of force. Flexibility in the functional end of the surgical instrument bit adds a range of function, force and direction which can be advantageous to the user, for example due to the many unusual angles several of the surgical instrument bits are used. A surgeon having knowledge in the field can determine the specific characteristics for any surgical instrument bit based on the desired function. For example, a surgical instrument bit intended to be used for cutting and sawing may require more rigidity and less flexibility than a surgical instrument bit intended to be used for dissection.

In one embodiment, a keyed slot of a surgical instrument bit may comprise a variety of shapes including cylindrical and horseshoe shapes in the form of a socket, wherein the universal bayonet holder is configured as a plug to engage an aperture disposed in one end of the socket. Other cross-sectional shapes of the keyed slot can be used. In addition, various lengths and sizes of handles with universal bayonet holders can be used.

In one embodiment, the surgical instrument bits attach to the handle using a pin and clevis attachment comprising a pin inserted through a hole or eye and secured with a clevis pin or cotter pin allowing for rotational movement.

In one embodiment, the surgical instrument bits attach to the handle using a bolt and nut threaded fastener system where a bolt is inserted through holes in the handle components and secured with a nut to provide for a strong and secure attachment.

In one embodiment, the surgical instrument bits attach to the handle using a magnetic attachment to join components together.

According to one embodiment of the invention, a plurality of surgical instrument bits is provided to mate with different handles, including but not limited to Numbers 3 through 9, at a minimum.

In one embodiment, the plurality of surgical instrument bits may be used with a handle having an integrated Light Emitting Diode (LED) as disclosed in U.S. Pat. Nos. 9,072,541 and 10,610,257.

In one embodiment, the interior cavity of the handle comprises a printed circuit board. In one embodiment, the printed circuit board comprises a wireless communication unit. In one embodiment, the interior cavity of the handle comprises a video camera. In one embodiment, the interior cavity of the handle comprises a computer chip. In one embodiment, the interior cavity of the handle comprises a digital recorder.

Figure 1A:
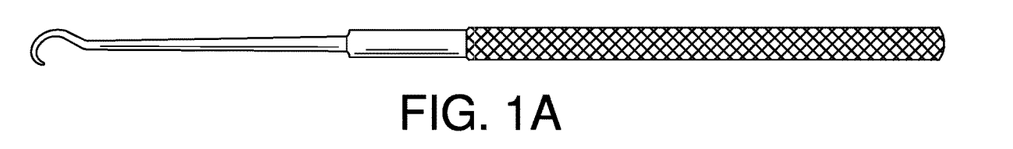
FIGS. 1A-1H depict various prior art surgical instruments.
Figure 1B:
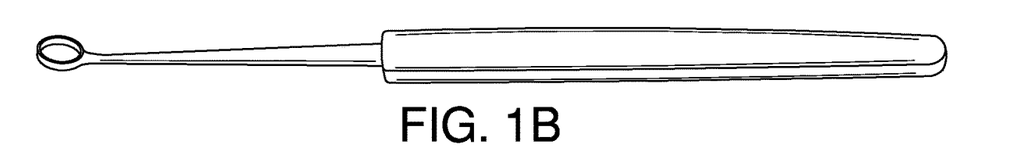
Figure 1C:
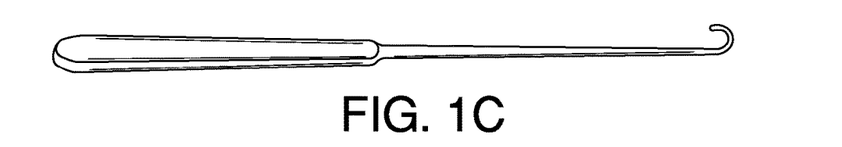
Figure 1D:
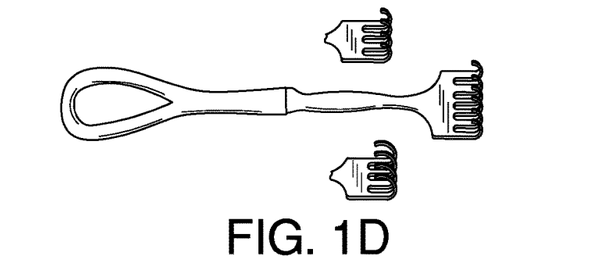
Figure 1E:
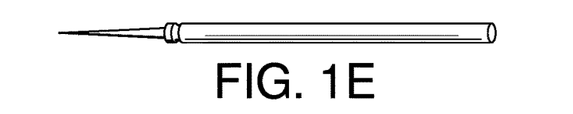
Figure 1F:
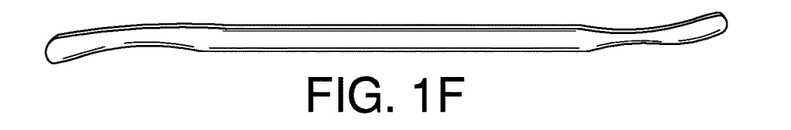
Figure 1G:
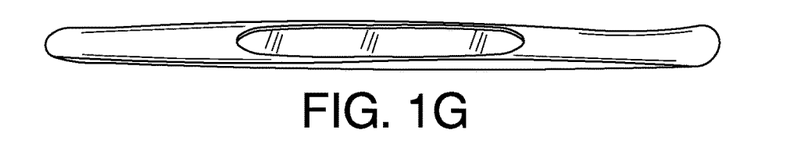
Figure 1H:
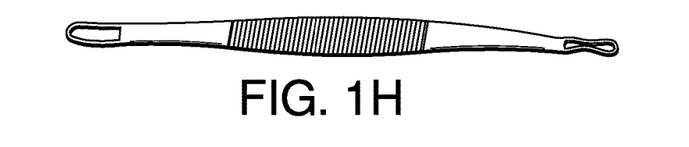

Turning to the drawings, FIGS. 1A-1H depict typical prior art surgical instruments. FIG. 1A depicts a skin hook; FIG. 1B depicts a curette; FIG. 1C depicts a bone hook; FIG. 1D depicts retractors; FIG. 1E depicts a splinter liberator and probe; FIG. 1F depicts a dissector; FIG. 1G depicts an elevator; and FIG. 1H depicts a comedo extractor.

Figure 2:
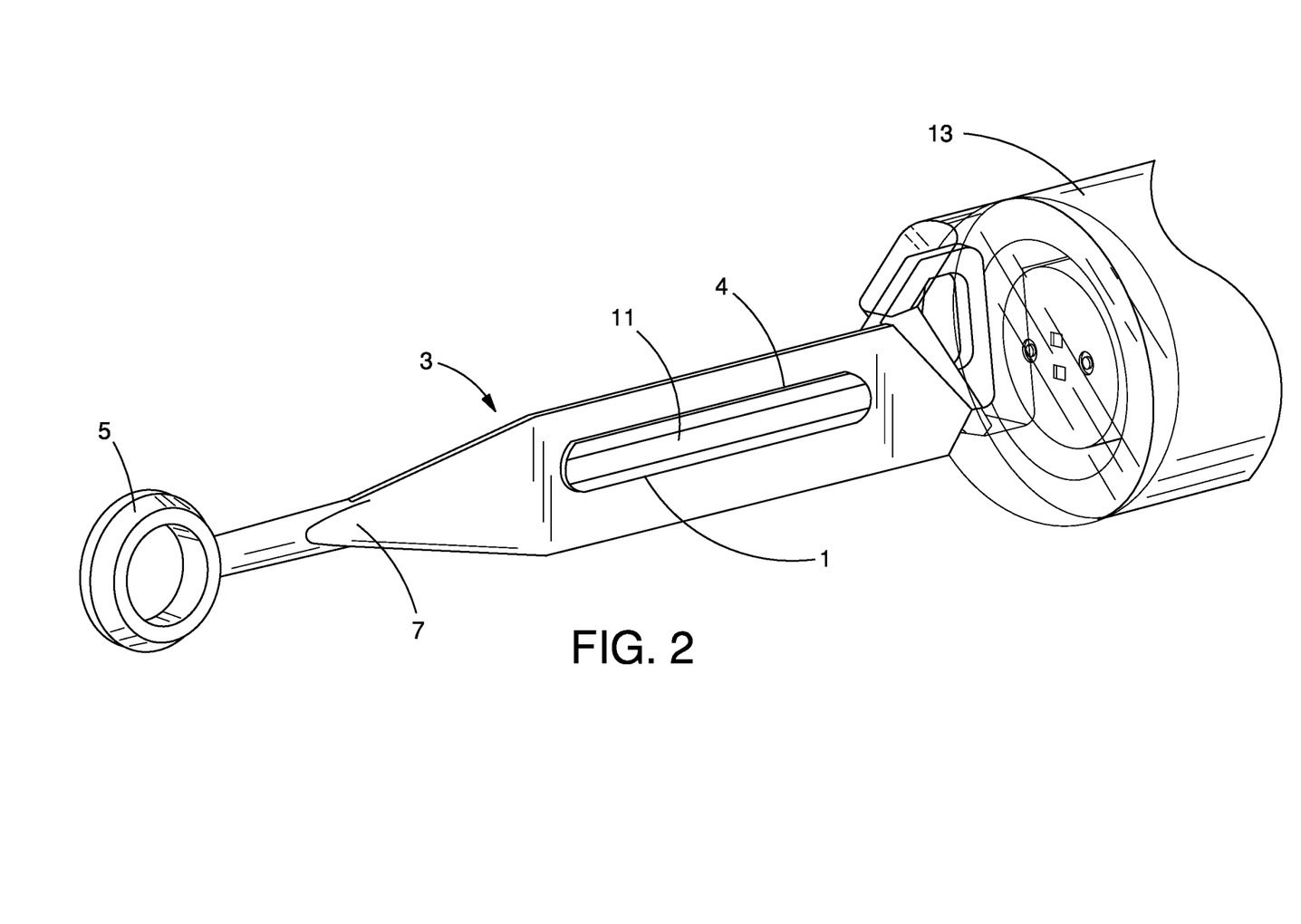
FIG. 2 depicts a perspective view of one embodiment of a surgical instrument bit comprising a hook having a keyed slot as attached to an elevated boss disposed on a universal bayonet holder and a handle.

FIG. 2 depicts a perspective view of one embodiment of a surgical instrument bit 3 comprising a curette 5 attached to a universal bayonet holder 4 having an elevated boss 11. Surgical instrument bit 3 comprises a keyed slot 1 predisposed on the end 2 distal from a surgical site. Keyed slot 1 and neck 7 with attached surgical instrument bit 3 mates with elevated boss 11 of universal bayonet holder 4 and is attached to handle 13.

Figures 3A, 3B:
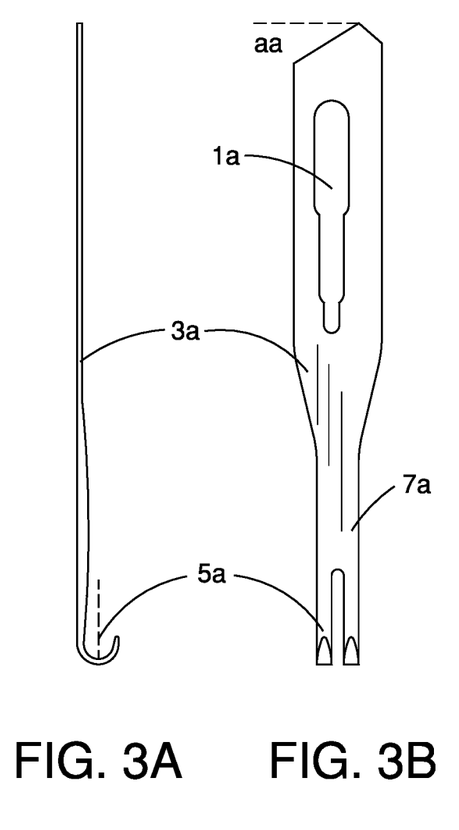
FIGS. 3A-3B depict a side view and a front view, respectively, of a surgical instrument bit comprising a hook.

FIGS. 3A and 3B are a side view and a front view, respectively, of surgical instrument bit 3a comprising hook 5a and keyed slot 1a and neck 7a. The end of surgical instrument bit 3a proximal where the end of a universal bayonet holder (not shown) meets a handle (not shown) is configured at angle $\alpha_a$.

Figures 3C, 3D:
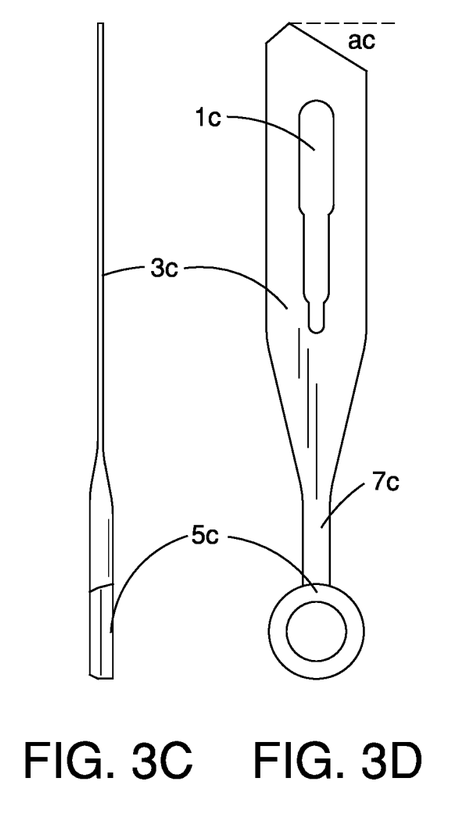
FIGS. 3C-3D depict a side view and a front view, respectively, of a surgical instrument bit comprising a curette.

FIGS. 3C and 3D are a side view and a front view, respectively, of surgical instrument bit 3c comprising curette 5c and keyed slot 1c and neck 7c. The end of surgical instrument bit 3c proximal where the end of a universal bayonet holder (not shown) meets a handle (not shown) is configured at angle $\alpha_c$.

Figure 3E:
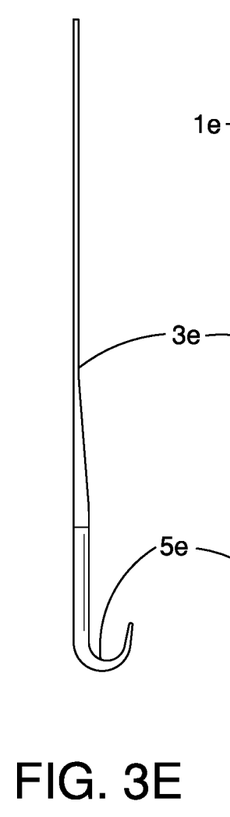
FIGS. 3E-3F depict a side view and a front view, respectively, of a surgical instrument bit comprising a retractor.
Figure 3F:
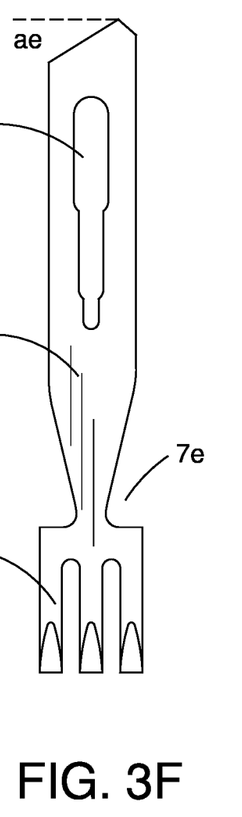

FIGS. 3E and 3F are a side view and a front view, respectively, of surgical instrument bit 3e comprising retractor 5e and keyed slot 1e and neck 7e. The end of surgical instrument bit 3e proximal where the end of a universal bayonet holder (not shown) meets a handle (not shown) is configured at angle $\alpha_e$.

Figure 3G:
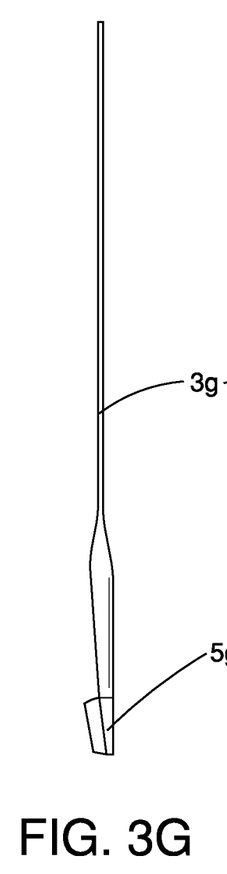
FIGS. 3G-3H depict a side view and a front view, respectively, of a surgical instrument bit comprising a curette.
Figure 3H:
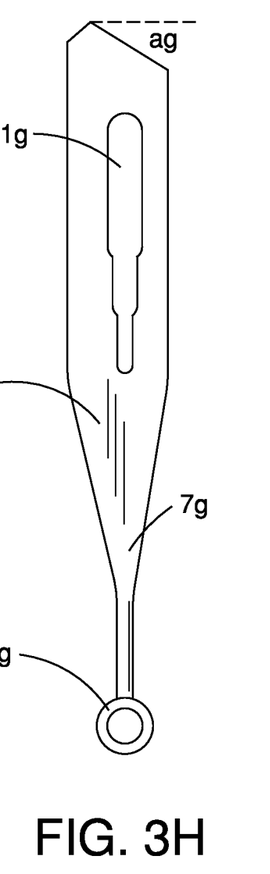

FIGS. 3G and 3H are a side view and a front view, respectively, of surgical instrument bit 3g comprising curette 5g and keyed slot 1g and neck 7g. The end of surgical instrument bit g proximal where the end of a universal bayonet holder (not shown) meets a handle (not shown) is configured at angle $\alpha_g$.

Figure 4:
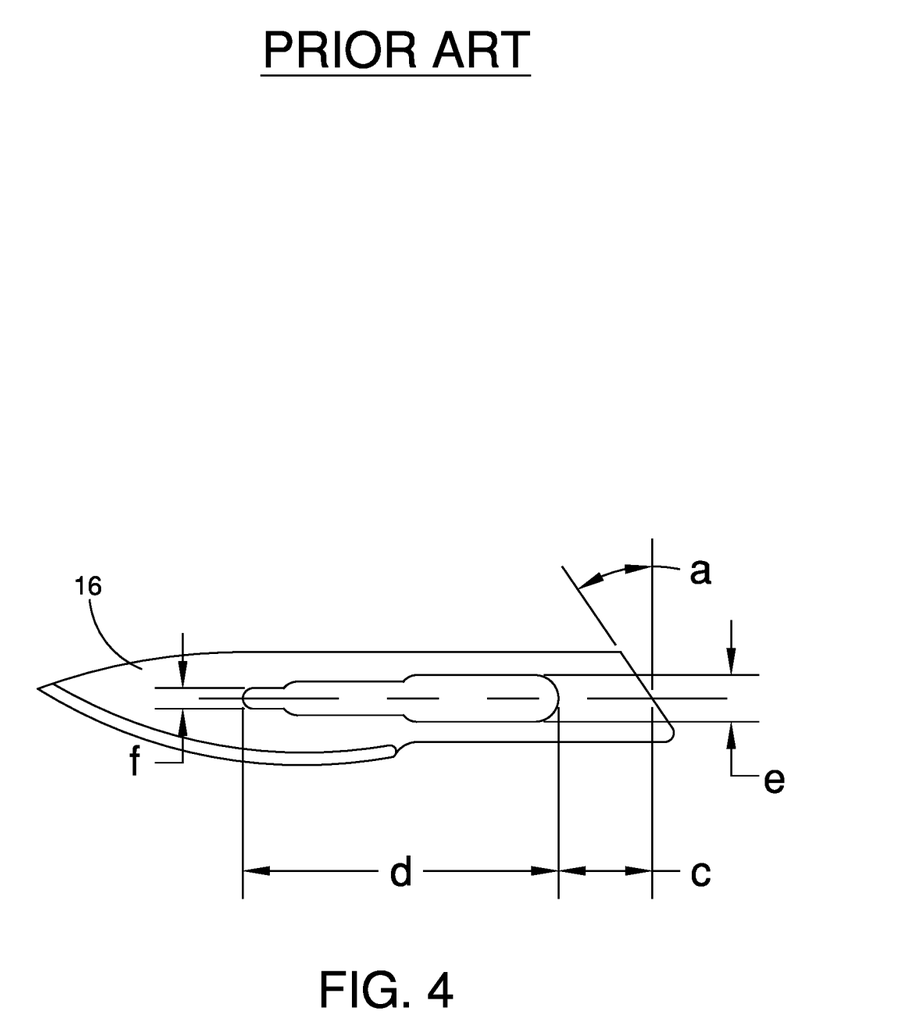
FIG. 4 depicts dimensions of keyed slots for use with various sized handles.

FIG. 4 depicts a scalpel blade 16 as seen in the prior art having keyed slot 1. The following are dimensions of keyed slot 1 when used with a No. 3 handle:

angle $\alpha$ of the end of scalpel blade 16 proximal where the end of universal bayonet holder 4 meets handle 13 is 30 degrees;

narrow portion f is 1.18 to 1.23 mm;

wider portion e of keyed slot 1 is 2.43 to 2.48 mm;

overall length d is 17.83 to 17.90 mm; and distance c between the end of keyed slot 1 and the angled rear end of scalpel blade 16 is 4.50 to 4.65 mm.

The following are dimensions of keyed slot 1 when used with a No. 4 handle:

angle $\alpha$ of the end of scalpel blade 16 proximal where the end of universal bayonet holder 4 meets handle 13 is 35 degrees;

narrow portion f is 1.95 to 2.00 mm;

wider portion e is 3.72 to 3.77 mm;

overall length d is 24.20 to 24.27 mm; and distance c between the end of keyed slot 1 and the angled rear end of scalpel blade 16 is 7.50 to 7.65 mm.

Figure 5:
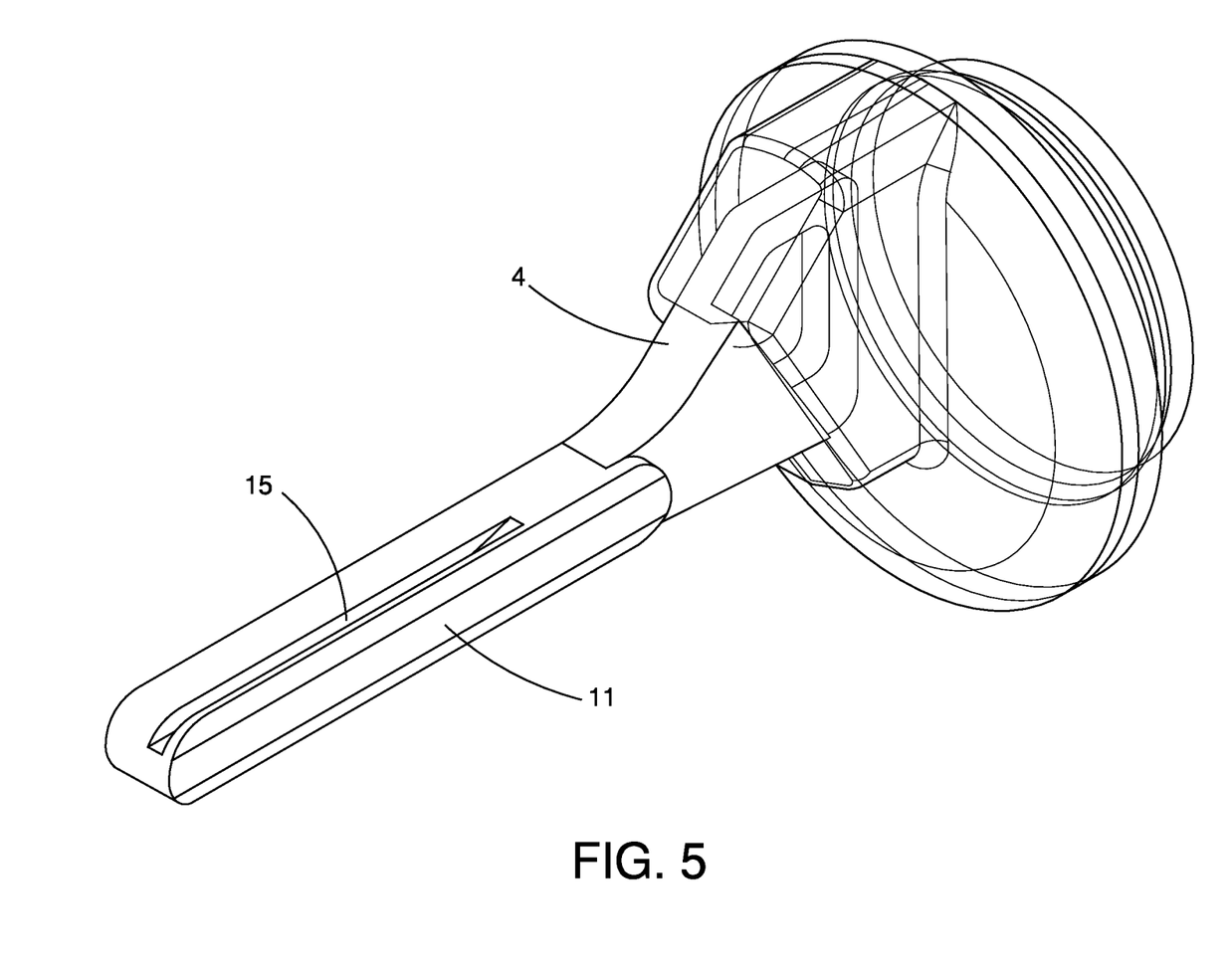
FIG. 5 depicts a perspective view of one embodiment of an elevated boss and universal bayonet holder to which a surgical instrument bit can be attached.

FIG. 5 depicts a perspective view of one embodiment of elevated boss 11 and universal bayonet holder 4 with groove 15 to which a surgical instrument bit (not shown) can be attached to a handle (not shown).

Figure 6:
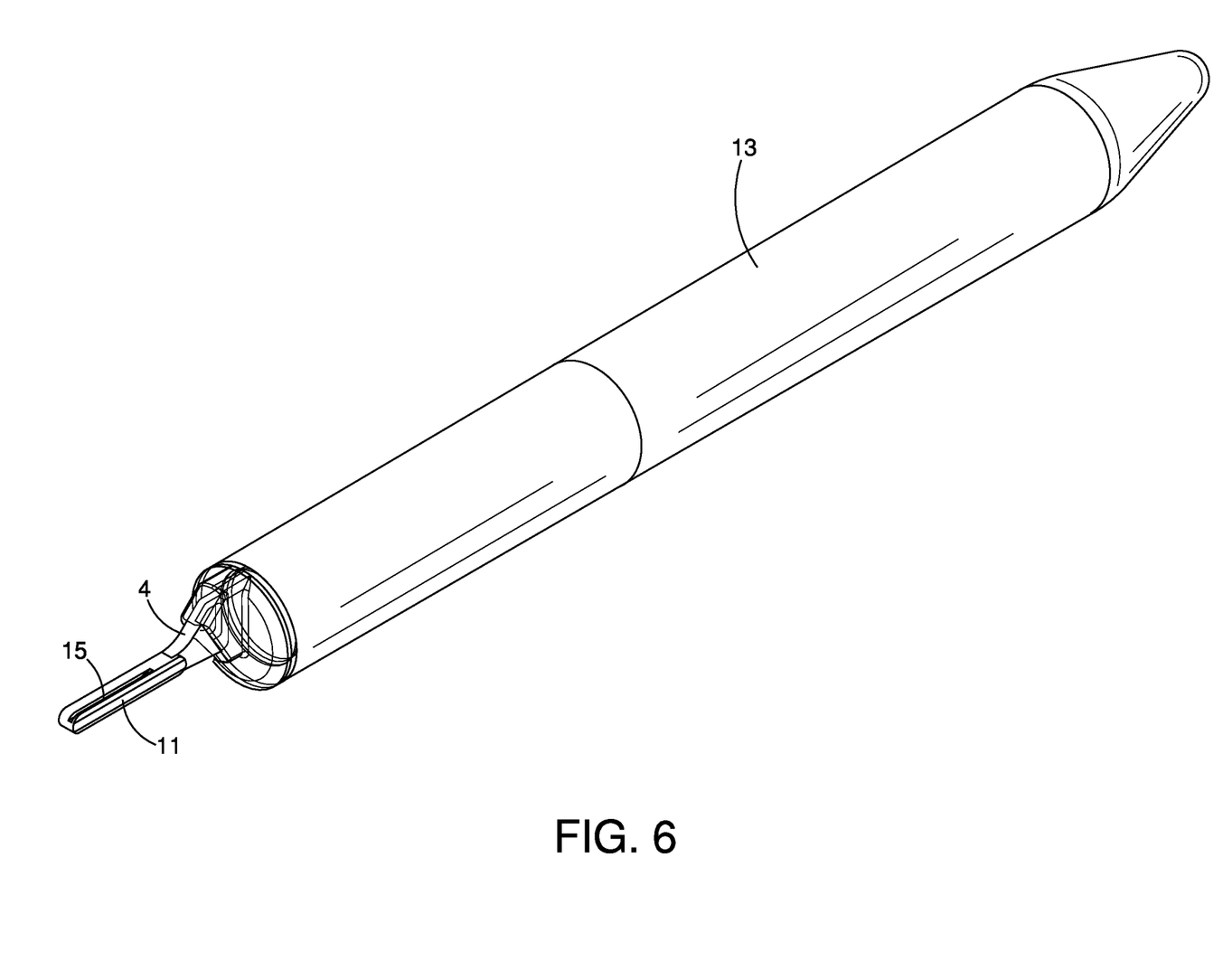
FIG. 6 depicts a perspective view of a handle having an elevated boss and universal bayonet holder to which a surgical instrument bit can be attached.

FIG. 6 depicts handle 13 with attached universal bayonet holder 4 and elevated boss 11 with groove 15 according to one embodiment of the invention.

Figure 7A:
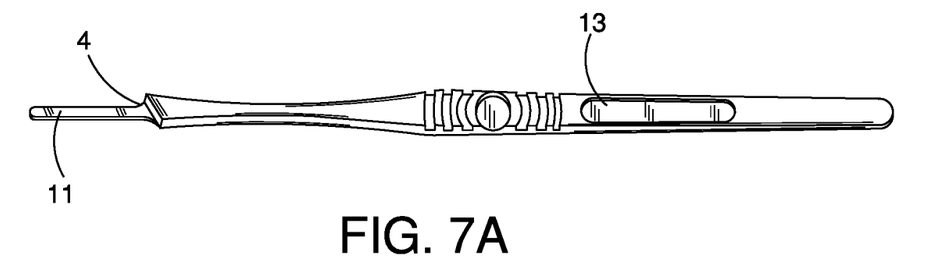
FIGS. 7A and 7B depict alternative embodiments of handles having an elevated boss and universal bayonet holder to which surgical instrument bits can be attached.
Figure 7B:
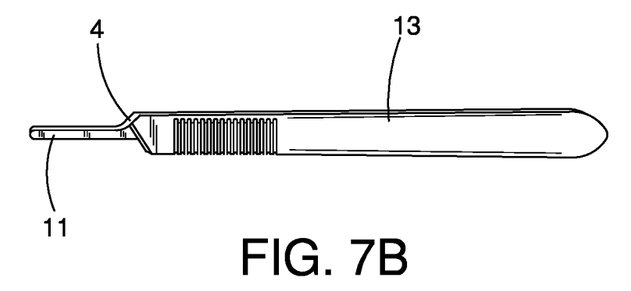

FIGS. 7A and 7B depict alternative handles 13 with attached bayonet holder 4 and elevated boss 11 according to other embodiments of the invention.

It will be appreciated by those skilled in the art and others that while the invention has been described in terms of certain embodiments, the invention can be modified in various ways in view of this disclosure and description.

What is claimed is:

1. A multi-function surgical instrument comprising:
    a handle, the handle comprising a proximal end and a distal end;
    a bayonet holder; and
    a surgical instrument unit, the surgical instrument unit comprising an engagement unit configured to mate with the bayonet holder,
    wherein the bayonet holder is attached to the distal end of the handle,
    wherein the handle, the bayonet holder and the attached surgical instrument unit are in longitudinal coordination,
    wherein the surgical instrument unit is releasably attached to the bayonet holder,
    wherein the surgical instrument unit comprises a skin hook, a retractor, a curette, a comedone extractor, forceps, an elevator, a dissector, a bone hook, a suture remover, a punch biopsy instrument, a splinter liberator, a reflecting device, a mirror, trocars or a probe,
    wherein the bayonet holder comprises an elevated boss, the engagement unit of the surgical instrument unit comprises a keyed slot in longitudinal coordination with a length dimension of the bayonet holder and the elevated boss, the keyed slot is configured to engage with the elevated boss, and the keyed slot comprises a reversibly deformable material, and
    wherein the keyed slot is configured to be deformed so as to be snap fit into a groove on the bayonet holder thereby being coupled to the elevated boss.

2. The multi-function surgical instrument of claim 1, wherein the handle further defines an interior cavity, wherein an electrical source pod is disposed in the interior cavity of the handle, wherein the electrical source pod comprises an illumination source, one or more electrical contacts, resistors, a printed circuit board, a positive terminal, a negative terminal, wherein the positive terminal and negative terminal are in electrical connection with the illumination source, and wherein the illumination source comprises an LED bulb.

3. The multi-function surgical instrument of claim 1, wherein the handle, the bayonet holder and the surgical instrument unit are disposable.

4. The multi-function surgical instrument of claim 1, wherein the handle, the bayonet holder and the surgical instrument unit are reusable.

5. The multi-function surgical instrument of claim 1, wherein the handle, the bayonet holder and the surgical instrument unit are sterilizable.

6. The multi-function surgical instrument of claim 1, wherein an interior cavity of the handle comprises a printed circuit board, a wireless communication unit, a video camera, a computer chip, a digital recorder or combinations thereof.

7. The multi-functional surgical instrument of claim 1, wherein the surgical instrument unit, the bayonet holder and the handle each comprises stainless steel, aluminum, plastic or combinations thereof.

8. A method of assembling a multi-functional surgical instrument, comprising:
    obtaining a handle, the handle having a bayonet holder attached to an end of the handle,
    wherein the handle and the bayonet holder are in longitudinal coordination, wherein the bayonet holder comprises a proximal end adjacent to the handle and a distal end distal from the handle;
    obtaining a surgical instrument unit, wherein the surgical instrument unit comprises an engagement unit configured to mate with the bayonet holder;
    aligning in longitudinal coordination the engagement unit of the surgical instrument unit with the distal end of the bayonet holder; and
    engaging the engagement unit of the surgical instrument unit with the bayonet holder,
    wherein the surgical instrument unit comprises a skin hook, a retractor, a curette, a comedone extractor, forceps, an elevator, a dissector, a bone hook, a suture remover, a punch biopsy instrument, a splinter liberator, a reflecting device, a mirror, trocars or a probe, and
    wherein the bayonet holder comprises an elevated boss in longitudinal coordination, the engagement unit comprises a keyed slot, the keyed slot comprises a top surface and a bottom surface that extend along a substantially longitudinal plane and a thickness, the elevated boss is configured to engage in an interior cavity defined by the keyed slot, the elevated boss comprises a groove that accommodates the thickness of the keyed slot, and
    wherein the keyed slot comprises a reversibly deformable material, and wherein engaging the engagement unit of the surgical instrument unit with the bayonet holder comprises:
        flexing the keyed slot to deform the longitudinal plane of the top surface and bottom surface of the keyed slot;

thereafter placing an end of the elevated boss distal from the handle in the interior cavity of the keyed slot;

thereafter engaging the keyed slot in the groove of the elevated boss by way of snap fit;

thereafter sliding the handle and bayonet holder in a direction toward and end of the keyed slot distal from the handle until the elevated boss is fully inserted within the keyed slot.

9. The method of claim 8, wherein the engagement unit of the surgical instrument unit comprises a socket and plug attachment, wherein an end of the surgical instrument unit comprises either a socket or a plug configured to fit inside the socket, wherein the bayonet holder comprises either a socket or a plug configured to fit into the socket, wherein engaging the engagement unit of the surgical instrument unit with the bayonet holder comprises:

wherein, if the end of the surgical instrument unit comprises a socket, mating the socket with the plug of the bayonet holder, wherein, if the end of the surgical instrument unit comprises a plug, mating the plug with the socket of the bayonet holder, and thereafter placing the plug into the socket.

10. A multi-function surgical instrument comprising:
a handle, wherein the handle comprises a proximal end and a distal end;
a bayonet holder; and
a surgical instrument unit, wherein the surgical instrument unit comprises an engagement unit configured to mate with the bayonet holder,
wherein the bayonet holder is attached to the distal end of the handle,
wherein the handle and the bayonet holder and the attached surgical instrument unit are in longitudinal coordination,
wherein the surgical instrument unit is releasably attached to the bayonet holder,
wherein the surgical instrument unit further comprises a flexible neck portion disposed between the engagement unit and an end of the surgical instrument unit distal from the handle, the flexible neck portion comprises a reversibly deformable material,
wherein the bayonet holder comprises an elevated boss, the engagement unit of the surgical instrument unit comprises a keyed slot in longitudinal coordination with a length dimension of the bayonet holder and the elevated boss, the keyed slot is configured to engage with the elevated boss, the keyed slot comprises a reversibly deformable material, and
wherein the keyed slot is configured to be deformed so as to be snap fit into a groove on the bayonet holder thereby being coupled to the elevated boss.

11. The multi-functional surgical instrument of claim 10, wherein the surgical instrument unit comprises a scalpel blade, a skin hook, a retractor, a curette, a comedone extractor, forceps, an elevator, a dissector, a bone hook, a suture remover, a punch biopsy instrument, a splinter liberator, a reflecting device, a mirror, trocars or a probe.

12. The multi-function surgical instrument of claim 10, wherein the handle further defines an interior cavity, wherein an electrical source pod is disposed in the interior cavity of the handle, wherein the electrical source pod comprises an illumination source, one or more electrical contacts, resistors, a printed circuit board, a positive terminal, and a negative terminal, wherein the positive terminal and negative terminal are in electrical connection with the illumination source, and wherein the illumination source comprises an LED bulb.

13. The multi-function surgical instrument of claim 10, wherein the handle, the bayonet holder and the surgical instrument unit are disposable.

14. The multi-function surgical instrument of claim 10, wherein the handle, the bayonet holder and the surgical instrument unit are reusable.

15. The multi-function surgical instrument of claim 10, wherein the handle, the bayonet holder and the surgical instrument unit are sterilizable.

16. The multi-function surgical instrument of claim 10, wherein an interior cavity of the handle comprises a printed circuit board, a wireless communication unit, a video camera, a computer chip, a digital recorder or combinations thereof.

17. The multi-functional surgical instrument of claim 10, wherein the elevated boss, surgical instrument unit, bayonet holder and handle each comprises stainless steel, aluminum, plastic, or combinations thereof.

18. A method of assembling a multi-functional surgical instrument, comprising:

obtaining a handle, the handle having a bayonet holder attached to an end of the handle, wherein the handle and the bayonet holder are in longitudinal coordination, wherein the bayonet holder comprises a proximal end adjacent to the handle and a distal end distal from the handle;

obtaining a surgical instrument unit, wherein the surgical instrument unit comprises an engagement unit configured to mate with the bayonet holder, wherein the surgical instrument unit comprises a flexible neck portion disposed between the engagement unit and an end of the surgical instrument unit distal from the handle;

aligning in longitudinal coordination the engagement unit of the surgical instrument unit with the distal end of the bayonet holder; and engaging the engagement unit of the surgical instrument unit with the bayonet holder, wherein the bayonet holder comprises an elevated boss in longitudinal coordination, the engagement unit comprises a keyed slot, the keyed slot comprises a top surface and a bottom surface that extend along a substantially longitudinal plane and a thickness, the elevated boss is configured to engage in an interior cavity defined by the keyed slot, the elevated boss comprises a groove that accommodates the thickness of the keyed slot, the keyed slot comprises a reversibly deformable material, and wherein engaging the engagement unit of the surgical instrument unit with the bayonet holder comprises:

flexing the keyed slot to deform the longitudinal plane of the top surface and bottom surface of the keyed slot;

thereafter placing an end of the elevated boss distal from the handle in the interior of the keyed slot;

thereafter engaging the keyed slot in the groove of the elevated boss by way of snap fit; and thereafter sliding the handle and bayonet holder in a direction toward the end of the keyed slot distal from the handle until the elevated boss is fully inserted within the keyed slot.

* * * * *